Figure 1:
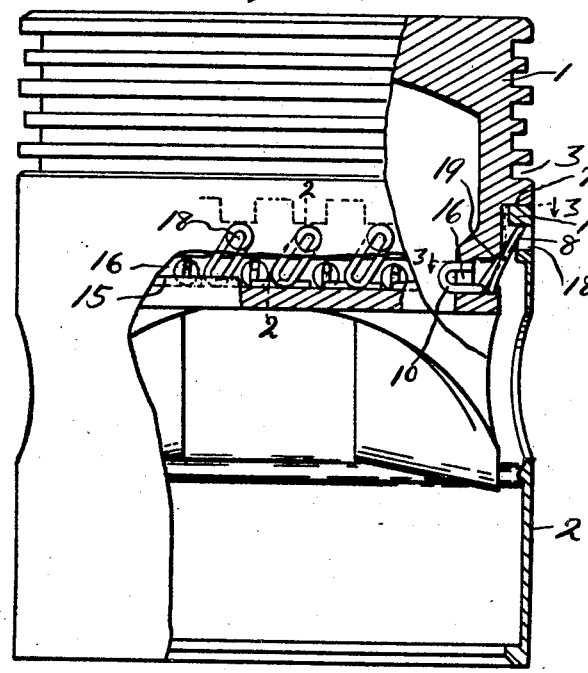

May 31, 1932.    P. M. FREER    1,860,734

PISTON

Filed Sept. 30, 1929

INVENTOR
Phelps M. Freer

BY
Whittemore Hulbert Whittemore Belknap
ATTORNEYS

Patented May 31, 1932

1,860,734

UNITED STATES PATENT OFFICE

PHELPS M. FREER, OF DETROIT, MICHIGAN

PISTON

Application filed September 30, 1929. Serial No. 396,342.

The invention relates to pistons and refers more particularly to pistons having separately formed heads and skirts. The invention has for one of its objects the provision of an improved construction for securing the head and skirt together in their proper relative positions in both radial and axial directions. Another object is the provision of a plurality of individual securing members between the head and skirt providing for relative expansion or contraction of the head and skirt without material change of the securing members in a direction peripherally of the head and skirt. Further objects of the invention reside in the novel features of construction and combinations and arrangements of parts as more fully hereinafter set forth.

In the drawings:—

Figure 2:
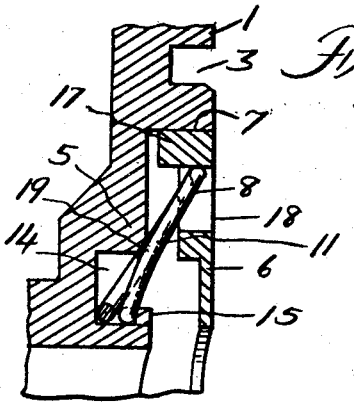
Figure 4:
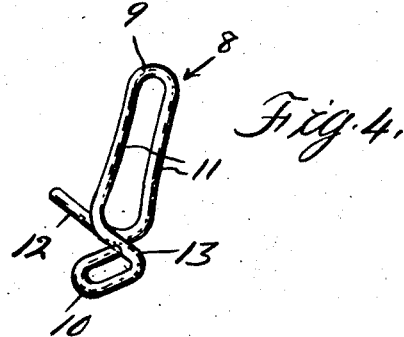
Figure 3:
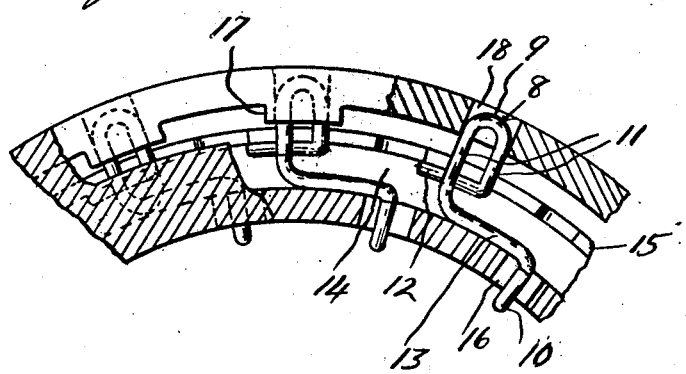

Figure 1 is an elevation, partly in section, of a piston embodying my invention;

Figures 2 and 3 are cross sections, respectively, on the lines 2—2 and 3—3 of Figure 1;

Figure 4 is a perspective view of one of the securing devices before assembly in the piston.

The piston comprises the head 1 and the skirt 2, the former being preferably formed of aluminum or an aluminum alloy and the latter being preferably formed of iron. The head has the annular grooves 3 for receiving the piston rings and the pair of diametrically opposite hubs for receiving the wrist pin, which connects the connecting rod to the piston. The head and skirt have the telescoping laterally spaced portions 5 and 6, respectively, and the head has the annular shoulder 7 adapted to engage one end of the skirt.

For securing the head and skirt together, I have provided the series of individual securing devices 8, which engage the telescoping portions 5 and 6. These securing devices are preferably located symmetrically relative to the axis of the piston and each of them is preferably formed of resilient wire and has the main loop 9 and preferably the minor loop 10, which extends transversely of the main loop. The main loop has the legs 11, which are substantially parallel to each other and are of substantially the same length. Each securing device has the legs 12 and 13 connecting into the legs 11 and extending transversely thereof and past each other in opposite directions, generally parallel to the loop 9. The leg 13 has its terminal portion bent to extend transversely of the main loop 9 and this terminal portion is preferably return bent to form the minor loop 10. If desired, the terminal portion of the leg may be straight instead of looped. The main axis of the main loop 9 is preferably inclined in a direction longitudinally of the legs 12 and 13 and is also preferably inclined upwardly and outwardly away from the minor loop 10.

The telescoping portion 5 of the head is formed with the annular groove 14 opening toward the telescoping portion 6 of the skirt and with the upwardly extending flange 15, which partially closes the annular groove 14. The telescoping portion of the head is also provided with the series of transverse radial openings 16 leading into the annular groove 14 and of a diameter approximately equalling the width of the groove. In the forming of these openings, the aligned portions of the flange 15 are cut away. The telescoping portion of the skirt has the peripherally interrupted inwardly extending flange 17 which abuts the annular shoulder 7 and also has the series of transverse radial openings 18 immediately adjacent to the flange 17 with their portions adjacent to this flange in the plane of its lower face. The main loop 9 of each securing device, when this device is assembled in the piston, extends into an opening 18 in the skirt and its minor loop 10 extends into an opening 16 in the head. The legs 12 and 13 of each device engage the base of the groove 14 behind the flange 15 and hold the securing device to the head. Since the legs 12 and 13 pass each other, the legs 11 of the main loop 9 are inclined relative to each other and one of these legs 11 contacts with the annular shoulder 19 formed upon the telescoping portion 5 of the head adjacent to the annular groove 14, while both of these legs and at least one of them contacts with the inner edge of the opening 18.

Each securing device is mounted upon and connected to the head by inserting the minor loop 10 through the channel 14 and into an opening 16 and swinging the securing device so that its legs 12 and 13 engage the base of the groove 14 behind the flange 15. The skirt may then be telescoped over the head and securing devices with the solid portions of the flange 17 located between the main loops 9 of the securing devices. When the interrupted flange 17 contacts with the annular shoulder 7 of the head, the skirt is then moved peripherally relative to the head and the securing devices and in the direction of the inclination of the major axes of the main loops of these securing devices. The lower surfaces of the solid portions of the flange 17 come into contact with the curved upper end portions of the main loops 9 and cam or wedge these main loops, tending to shorten the same along their major axes and also forming one of the legs 11 of the main loop of each securing device against the annular shoulder 19 of the head, thereby flexing these legs. When the upper end portions of the main loops have completely passed under the solid portions of the flange, the upper ends of these main loops then enter the openings 18 in the skirt, one of the legs 11 of the main loops of the securing devices still being held against the annular shoulder 19 and slightly flexed. At this time it is to be noted that each of the securing devices is under compression and acts both radially and axially of the piston upon the head and skirt to resiliently hold the same in their proper positions both radially and axially. In the event of unequal expansion or contraction of the head and skirt, it is to be noted that inasmuch as the securing devices are individual, their peripheral dimensions are not appreciably varied.

What I claim as my invention is:

1. In a piston, the combination with head and skirt members having telescoping laterally spaced portions, of means for securing said head and skirt members together, including a plurality of individual resilient wire members extending into the space between the telescoping portions having transversely extending loops, said head and skirt members having transverse openings for receiving said loops and locating said members peripherally relative to the head and skirt members.

2. In a piston, the combination with head and skirt members having telescoping laterally spaced portions, one of said members having an annular groove in its telescoping portion facing toward the telescoping portion of the other of said members and a flange partially closing the groove, said last mentioned member also having transverse openings into said groove, the other of said members having transverse openings in its telescoping portion spaced longitudinally of the piston from the first mentioned openings, and a plurality of individual wire members each having a loop in an opening of one of said head and skirt members and a transverse loop in an opening of the other of said head and skirt members, and a transverse portion engaging one side of said groove behind said flange for holding said securing member in place.

3. In a piston, the combination with head and skirt members having telescoping laterally spaced portions, of means for securing said head and skirt members together including a plurality of individual resilient wire members extending into the space between the telescoping portions and having transversely extending portions, said head and skirt members having transverse openings for receiving said transversely extending portions.

4. In a piston, the combination with head and skirt members, of a plurality of individual resilient members under compression securing said head and skirt members together, each of said members having end portions engaging said head and skirt members and an intermediate portion engaging said head member.

5. In a piston, the combination with head and skirt members having telescoping laterally spaced portions, of means for securing said head and skirt members together including a plurality of individual resilient members extending into the space between the telescoping portions and having transversely extending portions, said head and skirt members having openings for receiving said transversely extending portions and said skirt member having a shoulder for engaging one of said transversely extending portions intermediate the ends of said members.

6. In a piston, the combination with head and skirt members, of means for securing said head and skirt members together, comprising a resilient member having end portions engaging said head and skirt members, and an intermediate portion fulcrumed on one of said members.

7. In a piston, the combination with head and skirt members having telescoping laterally spaced portions, the telescoping portion of one of said members being provided with an annular groove and a flange partially closing said groove, of means for securing said head and skirt members together including a resilient member having a portion engaging said skirt member, a portion extending within said groove inside said flange and engaging said head member, and an intermediate portion fulcrumed upon said head member.

8. In a piston, the combination with head and skirt members having telescoping laterally spaced portions, of means for securing said head and skirt members together including resilient means having a portion for engaging said skirt member and a transverse portion for engaging said head member, said head and skirt members having transverse openings for receiving said portions.

9. In a piston, the combination with head and skirt members having axially abutting portions, of a plurality of pairs of oppositely facing axially spaced and radially aligning bearings on said members distributed circumferentially about the same and individual locking members under compression engaging the respective pairs of axially spaced and radially aligning bearings to hold said head and skirt in concentric engagement while permitting independent radial expansion.

10. In a piston, the combination with head and skirt members having axially abutting portions, of a plurality of pairs of oppositely facing axially spaced bearings on said head and skirt members circumferentially distributed about the same, individual resilient locking members under compression engaging said oppositely facing axially spaced bearings to hold said head and skirt members in engagement with each other, and means for holding the adjacent portions of said head and skirt members in radial alignment while permitting independent radial expansion.

11. In a piston, the combination with head and skirt members having axially abutting portions, of overlapping portions on said head and skirt members provided with oppositely facing spaced arcuate bearings distributed in pairs circumferentially thereof and individual resilient locking members under compression engaging said spaced arcuate bearings to hold said head and skirt member together in concentric arrangement while permitting independent radial expansion.

12. In a piston, the combination with head and skirt members having abutting portions, of a plurality of individual locking members between said head and skirt members distributed circumferentially about the same, and bearings arranged in pairs respectively on and formed in said head and skirt members with which bearings said individual locking members cooperate to restrain all relative movement of said head and skirt member other than in a radial direction.

In testimony whereof I affix my signature.

PHELPS M. FREER.